US012135950B2

(12) United States Patent
Forster et al.

(10) Patent No.: US 12,135,950 B2
(45) Date of Patent: Nov. 5, 2024

(54) AUTOMATED DOCUMENT ADAPTATION BASED ON TOPIC CLASSIFICATION

(71) Applicant: International Business Machines Corporation, Armonk, NY (US)

(72) Inventors: Micah Forster, Round Rock, TX (US); Sai Krishna Reddy Gudimetla, Jersey City, NJ (US); Aaron K. Baughman, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 354 days.

(21) Appl. No.: 17/408,715

(22) Filed: Aug. 23, 2021

(65) Prior Publication Data

US 2023/0056003 A1    Feb. 23, 2023

(51) Int. Cl.
  *G06F 40/44*    (2020.01)
  *G06F 17/18*    (2006.01)
  *G06F 40/247*   (2020.01)
  *G06F 40/30*    (2020.01)
  *G06N 3/045*    (2023.01)

(52) U.S. Cl.
  CPC .............. *G06F 40/44* (2020.01); *G06F 17/18* (2013.01); *G06F 40/247* (2020.01); *G06F 40/30* (2020.01); *G06N 3/045* (2023.01)

(58) Field of Classification Search
  None
  See application file for complete search history.

(56) References Cited

U.S. PATENT DOCUMENTS 9,336,268 B1 *  5/2016  Moudy ................... G06F 40/30
10,547,574 B2   1/2020  Pham
(Continued)

FOREIGN PATENT DOCUMENTS

CN          111401003 A     7/2020

OTHER PUBLICATIONS

Du et al. "Sentiment Analysis Method based on Piecewise Convolutional Neural Network and Generative Adversarial Network". International Journal of Computers Communications & Control ISSN 1841-9836, 14(1), Feb. 7-20, 2019 (Year: 2019).*

(Continued)

*Primary Examiner* — Jesse S Pullias
(74) *Attorney, Agent, or Firm* — Garg Law Firm, PLLC; Rakesh Garg; Michael O'Keefe

(57) ABSTRACT

Using a logistic regression classification model executing on a processor, a topic is classified into an interaction type in a set of predefined interaction types. A set of documents corresponding to the topic is extracted from a document repository. Using a generative adversarial model executing on a processor, a sentiment corresponding to a reaction to a previous presentation is scored, the scoring resulting in a scored sentiment. Using a trained attention layer model, the interaction type, the set of documents, and the scored sentiment are weighted, the weighting generating a weighted interaction type, a weighted set of documents, and a weighted scored sentiment. Using a natural language generation transformer model executing on the processor, a document in the weighted set of documents is weighted according to the weighted interaction type and the weighted scored sentiment.

20 Claims, 8 Drawing Sheets

(56) References Cited

U.S. PATENT DOCUMENTS

| | | | |
|---|---|---|---|
| 10,599,699 B1* | 3/2020 | Bartolome | G06F 16/35 |
| 11,023,675 B1* | 6/2021 | Neervannan | G06F 40/205 |
| 11,055,119 B1* | 7/2021 | Silverstein | G06N 3/08 |
| 11,086,857 B1* | 8/2021 | Ganu | G06F 16/24522 |
| 11,138,212 B2* | 10/2021 | Jauhari | G06F 16/24578 |
| 2015/0286747 A1 | 10/2015 | Anastasakos et al. | |
| 2017/0098122 A1 | 4/2017 | el Kaliouby et al. | |
| 2017/0192959 A1* | 7/2017 | Lee | G06F 40/30 |
| 2018/0316636 A1* | 11/2018 | Kamat | H04L 51/046 |
| 2019/0266250 A1 | 8/2019 | Toplyn | |
| 2020/0219495 A1* | 7/2020 | Alkan | G10L 15/22 |
| 2020/0227032 A1 | 7/2020 | Toplyn | |
| 2020/0387534 A1* | 12/2020 | Rendahl | G06F 16/685 |
| 2021/0082420 A1* | 3/2021 | Kraljic | G10L 15/1815 |
| 2021/0133279 A1* | 5/2021 | Shirani | G06F 40/279 |
| 2022/0083738 A1* | 3/2022 | Frazier | G06N 3/044 |

OTHER PUBLICATIONS

Luo et al., Pun-GAN: Generative Adversarial Network for Pun Generation, Proceedings of the 2019 Conference on Empirical Methods in Natural Language Processing and the 9th International Joint Conference on Natural Language Processing, pp. 3388-3393, Hong Kong, Nov. 3-7, 2019.

Diao et al., AFPun-GAN: Ambiguity-Fluency Generative Adversarial Network for Pun Generation, In: Zhu X., Zhang M., Hong Y., He R. (eds) Natural Language Processing and Chinese Computing, NLPCC 2020, Lecture Notes in Computer Science, vol. 12430, pp. 604-616, 2020.

Weller et al., Can Humor Prediction Datasets be used for Humor Generation? Humorous Headline Generation via Style Transfer, Proceedings of the Second Workshop on Figurative Language Processing, pp. 186-191, Jul. 9, 2020.

Saha et al., Unsupervised Deep Representations for Learning Audience Facial Behaviors, May 10, 2018.

Petrovic et al., Unsupervised joke generation from big data, Proceedings of the 51st Annual Meeting of the Association for Computational Linguistics, pp. 228-232, Sofia, Bulgaria, Aug. 4-9, 2013.

Ren et al., Neural Joke Generation, 2017.

Jaiswal et al., Automatic Humour Detection in Tweets using Soft Computing Paradigms, 2019 International Conference on Machine Learning, Big Data, Cloud and Parallel Computing (COMITCon), Feb. 14-16, 2019.

Mathur et al., A Comparative Study of Soft Computing Paradigms for Automatic Humour Detection in Tweets, 2019 6th International Conference on Computing for Sustainable Global Development (INDIACom), Mar. 13-15, 2019.

Yang et al., Multimodal Indicators of Humor in Videos, 2019 IEEE Conference on Multimedia Information Processing and Retrieval (MIPR), Mar. 28-30, 2019.

\* cited by examiner

*Fig. 1B*

$$f(x_1, \ldots, x_K; \alpha_1, \ldots, \alpha_K) = \frac{1}{B(\alpha)} \prod_{i=1}^{K} x_i^{\alpha_i - 1}$$

*Fig. 1C*

$$\alpha = (\alpha_1, \ldots, \alpha_K)$$

$$B(\alpha) = \frac{\prod_{i=1}^{K} \Gamma(\alpha_i)}{\Gamma\left(\sum_{i=1}^{K} \alpha_i\right)}$$

AUTOMATED DOCUMENT ADAPTATION BASED ON TOPIC CLASSIFICATION

BACKGROUND

The present invention relates generally to a method, system, and computer program product for automated document adaptation. More particularly, the present invention relates to a method, system, and computer program product for automated document adaptation based on topic classification.

A chatbot is a software application that conducts a conversational interaction, via text or text converted to speech, with a human user. Many users prefer to engage with a human-like interface instead of navigating a menu system or providing an explicit search string. Thus, chatbot-style techniques are often used in interactive systems that need to elicit information from users, such as customer service, request routing, and information gathering.

A chatbot is one example of an application using natural language processing techniques. Natural language processing is concerned with analyzing large amounts of natural language data, for example in the form of documents, to categorize and organize the documents as well as extract information and insights from the documents. A natural language document includes one or more natural language words, grouped into one or more natural language sentences. However, a word need not conform to the spelling rules of a particular natural language, and a sentence need not conform to the grammar of a particular natural language.

SUMMARY

The illustrative embodiments provide a method, system, and computer program product. An embodiment includes a method that classifies, using a logistic regression classification model executing on a processor, a topic into an interaction type in a set of predefined interaction types. An embodiment extracts, from a document repository, a set of documents corresponding to the topic. An embodiment scores, using a generative adversarial model executing on a processor, a sentiment corresponding to a reaction to a previous presentation, the scoring resulting in a scored sentiment. An embodiment weights, using a trained attention layer model, the interaction type, the set of documents, and the scored sentiment, the weighting generating a weighted interaction type, a weighted set of documents, and a weighted scored sentiment. An embodiment adjusts, using a natural language generation transformer model executing on the processor according to the weighted interaction type and the weighted scored sentiment, a document in the weighted set of documents.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 1B depicts an equation;

FIG. 1C depicts an equation;

DETAILED DESCRIPTION

Figure 1A:
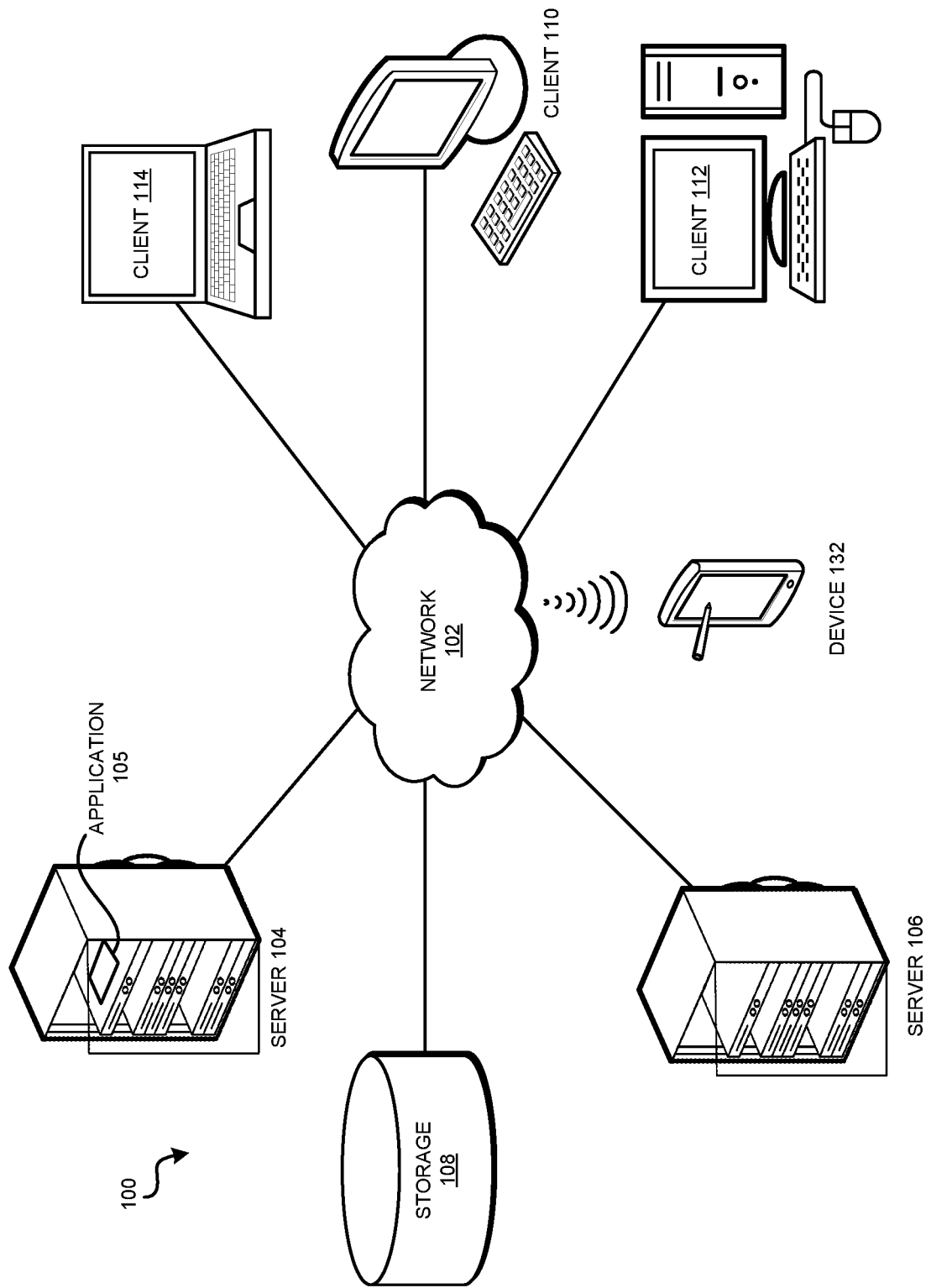
FIG. 1A depicts a block diagram of a network of data processing systems in which illustrative embodiments may be implemented.

The illustrative embodiments recognize that chatbots and other human-computer interaction systems often use elements from a document repository to provide information to a user. In particular, chatbots and other human-computer interaction system uses a basic text classifier to classify user input and provide a scripted, static response from a corpus of such responses. For example, using a document repository including a set of model answers to queries, a system's initial introduction to a user might be, "Hi, I'm the automated interaction system, how can I help?" and a system's first response to a user's input might be, "I see you're asking about Product A. Would you like general information or can I answer a more specific question?" In the example first response, Product A might be replaced with another product, depending on the user's input. However, because the elements are selected from an already-compiled document repository, with only minimal "fill in the blanks" adaptation, they can seem static and insufficiently adaptive to a user's specific needs, responses, and sentiments. For example, an angry user might perceive such static responses to be insufficiently helpful, possibly making such a user angrier.

The illustrative embodiments also recognize that one way to improve an interaction system is by introducing humorous elements, which help a user perceive an automated system as friendly and likable. However, techniques are not yet available that reliably generate natural language humor, necessitating the use of static responses from a repository of static jokes or other humor. Such static humor elements can also seem static and insufficiently adaptive to a user's specific needs, responses, and sentiments.

Thus, the illustrative embodiments recognize that there is an unmet need to adapt the static elements within a document repository based on a user's specific topic, interaction type, and, optionally, detected audience sentiment. This need is particularly lacking when incorporating humorous elements into a human-computer interaction.

The illustrative embodiments recognize that the presently available tools or solutions do not address these needs or provide adequate solutions for these needs. The illustrative embodiments used to describe the invention generally address and solve the above-described problems and other problems related to automated document adaptation based on topic classification.

An embodiment can be implemented as a software application. The application implementing an embodiment can be configured as a modification of an existing chatbot or other automated natural language interaction system, as a separate application that operates in conjunction with an existing chatbot or other automated natural language interaction system, a standalone application, or some combination thereof.

Particularly, some illustrative embodiments provide a method that classifies a topic into an interaction type, extracts a set of documents corresponding to the topic from a document repository, scores a sentiment corresponding to a reaction to a previous presentation, weights the interaction type, the set of documents, and the scored sentiment, and adjusts a document in the weighted set of documents according to the weighted interaction type and the weighted scored sentiment.

An embodiment identifies an interaction topic, also referred to as a theme. One embodiment offers a user an opportunity to select from a set of predefined topics using a user interface. For example, a help system might offer a user a selection of products for which help is available. Another embodiment uses a presently known natural language analysis technique, implemented using a natural language processing model executing on a processor, to identify an interaction topic from a user's natural language input to the conversational system. For example, if a user inputs, "Hi, when will Product A be released?" the embodiment uses a presently known natural language analysis technique to identify Product A, or the release date for Product A, as an interaction topic. Another embodiment uses a presently known natural language analysis technique to identify an interaction topic from natural language content other users are consuming (e.g. written, audio, or video content distributed via a website or streaming platform) or discussing (e.g. within a social media platform or other communications network).

An embodiment classifies the interaction topic into an interaction type in a set of predefined interaction types. To perform the classification, one embodiment uses a trained logistic regression classification model. During training, a logistic regression classification model learns to place labeled training input into the correct category. For example, when incorporating humorous elements, the set of predefined interaction types might include: (1) Anecdotal—jokes pertaining to personal stories that are partly true but also fabricated; (2) Dry—delivered with an impassive, expressionless, matter-of-fact presentation; (3) Highbrow—humor pertaining to cultured, sophisticated themes; (4) Ironic—humor involving incongruity and discordance with norms, in which the intended meaning is opposite or nearly opposite to the literal meaning; (5) Satire—humor that mocks human weaknesses or aspects of society; (6) Self-deprecating—humor in which performers target themselves and their foibles or misfortunes for comic effect.

An embodiment extracts a set of documents corresponding to the topic from a document repository. For example, if the topic is Product A, the embodiment extracts a set of documents corresponding to Product A. To extract the set of documents, one embodiment forms a query from the topic, for example by combining words from the topic and (optionally) interaction type into a text string. The embodiment converts words in the query to corresponding numerical representations, or vectors, in which a measure of similarity between vectors corresponds to semantic similarity between words. The embodiment uses vectorized query words to obtain synonyms for words in the query, and adds the synonyms to the query. Documents in the natural language document repository originated in text form or were converted to text from another form, such as audio or video, using presently available techniques. Documents in the repository have also been processed by a presently known concept to vector technique, which converts a concept expressed in a document to a corresponding vector in which a measure of similarity between vectors corresponds to semantic similarity between concepts. Thus, by computing a measure of similarity between a vector representing a query, or a portion of a query, with a vector representing a concept, the embodiment determines which documents most closely match the query. Another embodiment uses another presently known natural language processing technique to extract the set of documents.

An embodiment scores a sentiment corresponding to a reaction to a previous presentation. Sentiment analysis uses one or more of natural language processing, text analysis, computational linguistics, biometrics, and another technique to identify, extract, and quantify affective states and subjective information. One non-limiting example of sentiment analysis classifies an expressed reaction as positive, negative, or neutral. Another non-limiting example of sentiment analysis classifies a reaction into one or more emotional states such as enjoyment, anger, disgust, sadness, fear, and surprise. In another non-limiting example, a sentiment classification is accompanied by a corresponding confidence value, i.e. a confidence that the classification is correct. One embodiment applies the output of one or more sensors measuring a user or audience's physical reaction to the previous presentation to a sentiment scoring module. Some non-limiting examples of sensors measuring a user or audience's physical reaction are an audio sensor sensing a user's speech or other vocalizations (e.g. laughing), a video sensor sensing images of a user's appearance, and a gas emission sensor measuring gas emissions from a user's or audience member's mouth (e.g. to help determine laughing). Another embodiment converts output from an audio sensor sensing a user's speech or other vocalizations into text and applies the text to a sentiment scoring module. Another embodiment applies text comprising a user's or audience's reaction to a sentiment scoring module. To perform the sentiment scoring, one embodiment uses a generative adversarial model. A generative adversarial model includes two sub-models: a generator model that generates new examples and a discriminator model that classifies the generated examples as either real (from actual input data) or fake (generated by the generator model). Both sub-models are typically implemented using neural networks. When applied to sentiment scoring, the generator scores a sentiment expressed in input data and the classifier classifies the scored sentiment as correct or incorrect. For example, the model might take as input audio data of a user laughing, video data of a user smiling, and text data including the smiling face emoji, and score the input data is belonging to a happy or enjoyment sentiment category (optionally, with a corresponding confidence value).

An embodiment weights the interaction type, the set of documents, and the scored sentiment, if available. Another embodiment also weights a time elapsed in a particular interaction session or a time remaining in a particular interaction session. Another embodiment also weights a location of an interaction. Another embodiment also weights a format (e.g. text, audio, video) of an interaction. By performing weighting, an embodiment takes context into account when adjusting a document.

One embodiment uses an attention layer, implemented using one or more encoding layers, to perform the weighting. Inputs to the attention layer are one or more vectors representing portions words or other portions of a natural language document, as well as positions of those words within the document. Techniques for determining input vectors are presently known. The output is a weighted vector that provides context on the input weighting the significance of each word or other document portion in the original input.

An embodiment, optionally, filters vectors output from the attention layer. One embodiment filters vectors by treating weights within encoding layers of the trained attention layer as parameters of a Dirichlet distribution, a type of presently known probability distribution that forms a triangular shape generalized to more than two dimensions, and removing vectors that are more than a threshold distance from one or more extreme points of the distribution. Particularly when used to adapt humorous elements, because vectors at the extreme points are less probable, and hence more unexpected, than vectors towards the middle of the distribution, and unexpected elements are more likely to be found humorous than expected elements, vectors towards the middle of the distribution are less likely to be found humorous and can be removed. In one embodiment, if the Dirichlet distribution is expressed as shown in FIG. 1B, with representation shown in FIG. 1C, where the x values represent weights of the first encoding layer of the attention layer, and the alpha values represent weights of the second to last encoding layer of the attention layer.

An embodiment adjusts a document in the weighted set of documents according to the weighted interaction type and the weighted scored sentiment. One embodiment uses a transformer model to adjust a document. A transformer model, or transformer, is a presently known model with an encoder-decoder architecture. The encoder portion consists of a set of encoding layers that process an input sequence iteratively, one layer after another, while the decoder portion consists of decoding layers that do the same thing to the encoder's output. Each encoder layer generates encodings that contain information about which parts of the inputs are relevant to each other, and passes its output encodings to inputs of the next encoder layer. Each decoder layer does the opposite, taking all the encodings and using their incorporated contextual information to generate an output sequence that corresponds to the input sequence. Thus, if the input sequence is a natural language document, the output sequence is another natural language document adjusted according to the weighted interaction type and the weighted scored sentiment.

An embodiment provides the adjusted document to a user in response to an input from the user. For example, if the user input was, "Hi, when will Product A be released?", an embodiment provides natural language content about Product A, adjusted according to the interaction type and scored sentiment.

The manner of automated document adaptation based on topic classification described herein is unavailable in the presently available methods in the technological field of endeavor pertaining to automated conversational systems. A method of an embodiment described herein, when implemented to execute on a device or data processing system, comprises substantial advancement of the functionality of that device or data processing system in classifying a topic into an interaction type, extracting a set of documents corresponding to the topic from a document repository, scoring a sentiment corresponding to a reaction to a previous presentation, weighting the interaction type, the set of documents, and the scored sentiment, and adjusting a document in the weighted set of documents according to the weighted interaction type and the weighted scored sentiment.

The illustrative embodiments are described with respect to certain types of interactions, interaction types, weights, vectors, encodings, decodings, classification models, sentiment analysis models, attention mechanisms, transformer models, thresholds, responses, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
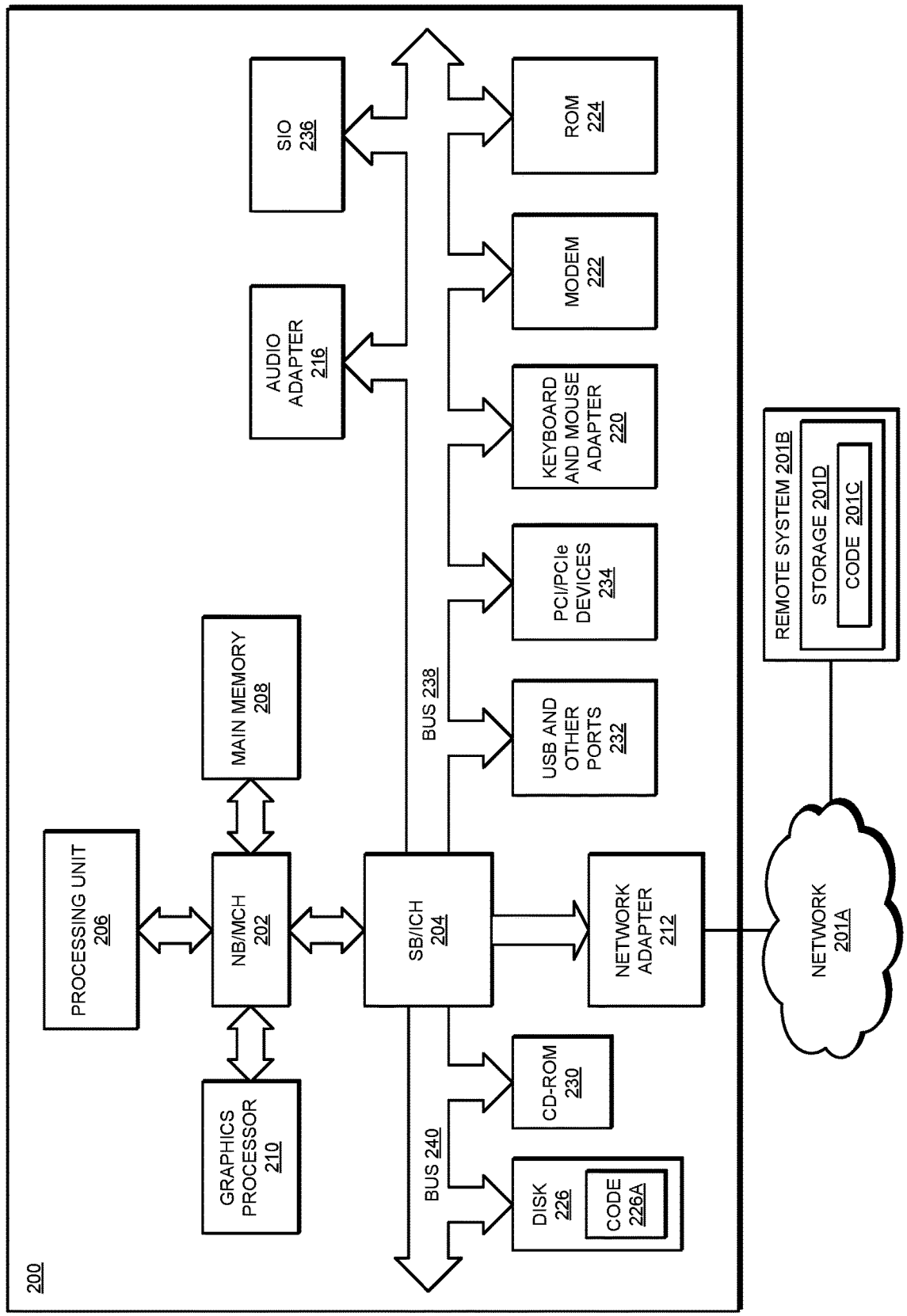
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1A depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1A depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1A can be configured to execute in device 132 in a similar manner. Any data or information stored or produced in another data processing system in FIG. 1A can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1A is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1A, or another type of device in which computer usable program code or instructions implementing the processes may be located for the illustrative embodiments.

Data processing system 200 is also representative of a data processing system or a configuration therein, such as data processing system 132 in FIG. 1A in which computer usable program code or instructions implementing the processes of the illustrative embodiments may be located. Data processing system 200 is described as a computer only as an example, without being limited thereto. Implementations in the form of other devices, such as device 132 in FIG. 1A, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1A, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
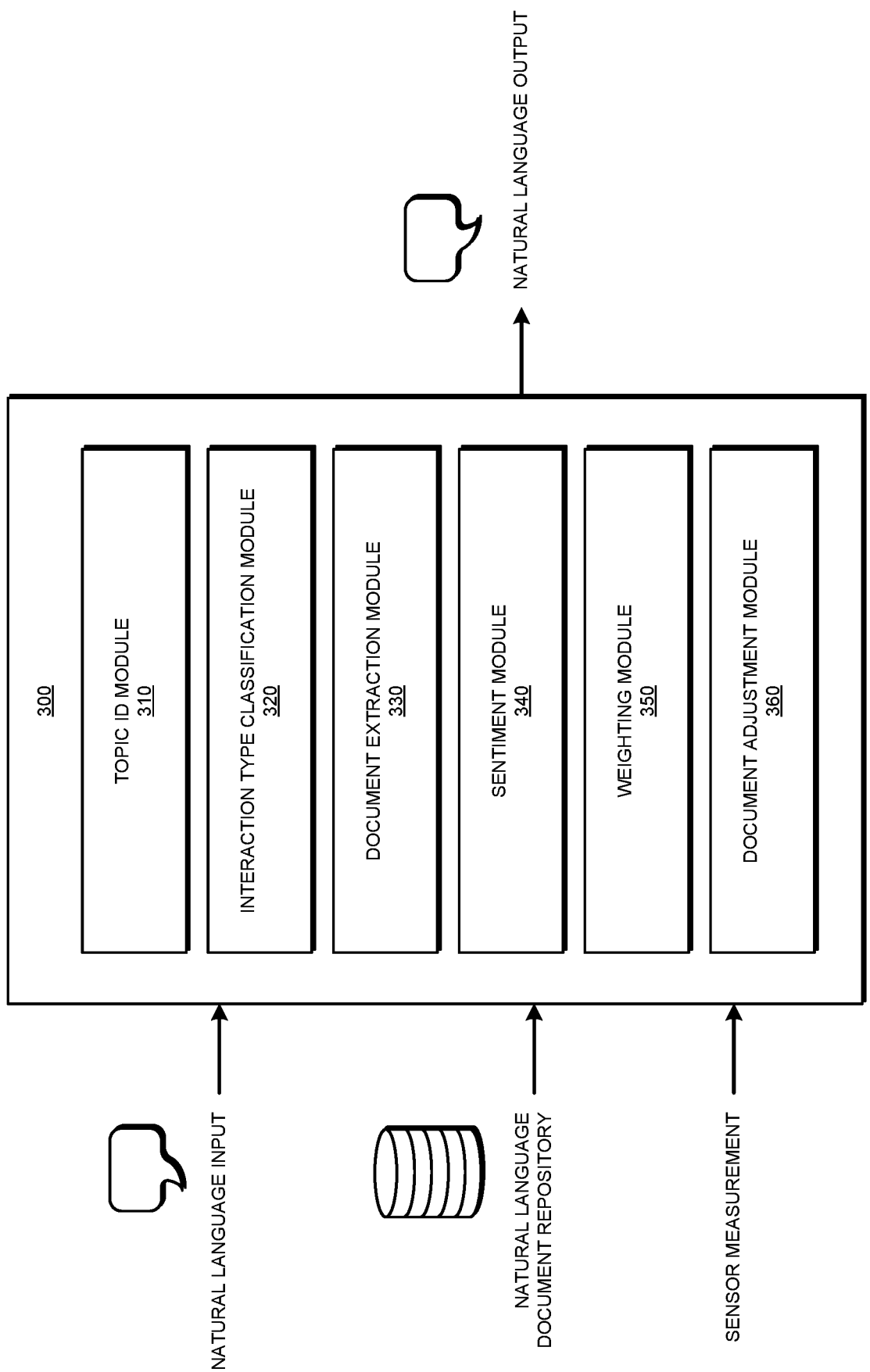
FIG. 3 depicts a block diagram of an example configuration for automated document adaptation based on topic classification in accordance with an illustrative embodiment.

With reference to FIG. 3, this figure depicts a block diagram of an example configuration for automated document adaptation based on topic classification in accordance with an illustrative embodiment. Application 300 is an example of application 105 in FIG. 1A and executes in any of servers 104 and 106, clients 110, 112, and 114, and device 132 in FIG. 1A.

Topic identification module 310 identifies an interaction topic, also referred to as a theme. One implementation of module 310 offers a user an opportunity to select from a set of predefined topics using a user interface. Another implementation of module 310 uses a natural language analysis technique to identify an interaction topic from a user's natural language input to the conversational system. Another implementation of module 310 uses a natural language analysis technique to identify an interaction topic from natural language content other users are consuming or discussing.

Interaction type classification module 320 classifies the interaction topic into an interaction type in a set of predefined interaction types. To perform the classification, one implementation of module 320 uses a trained logistic regression classification model. During training, a logistic regression classification model learns to place labeled training input into the correct category.

Document extraction module 330 extracts a set of documents corresponding to the topic from a document repository. To extract the set of documents, one implementation of module 330 forms a query from the topic, for example by combining words from the topic and (optionally) interaction type into a text string. The implementation converts words in the query to corresponding numerical representations, or vectors, in which a measure of similarity between vectors corresponds to semantic similarity between words. The implementation uses vectorized query words to obtain synonyms for words in the query, and adds the synonyms to the query. Documents in the natural language document repository originated in text form or were converted to text from another form, such as audio or video, using presently available techniques. Documents in the repository have also been processed by a presently known concept to vector technique, which converts a concept expressed in a document to a corresponding vector in which a measure of similarity between vectors corresponds to semantic similarity between concepts. Thus, by computing a measure of similarity between a vector representing a query, or a portion of a query, with a vector representing a concept, the implementation determines which documents most closely match the query. Another implementation of module 330 uses another presently known natural language processing technique to extract the set of documents.

Sentiment module 340 scores a sentiment corresponding to a reaction to a previous presentation. One implementation of module 340 applies the output of one or more sensors measuring a user or audience's physical reaction to the previous presentation to a sentiment scoring module. Some non-limiting examples of sensors measuring a user or audience's physical reaction are an audio sensor sensing a user's speech or other vocalizations (e.g. laughing), a video sensor sensing images of a user's appearance, and a gas emission sensor measuring gas emissions from a user's or audience member's mouth. Another implementation of module 340 converts output from an audio sensor sensing a user's speech or other vocalizations into text and applies the text to a sentiment scoring module. Another implementation of module 340 applies text comprising a user's or audience's reaction to a sentiment scoring module. To perform the sentiment scoring, one implementation of module 340 uses a generative adversarial model. When applied to sentiment scoring, the generator scores a sentiment expressed in input data and the classifier classifies the scored sentiment as correct or incorrect.

Weighting module 350 weights the interaction type, the set of documents, and the scored sentiment, if available. Another implementation of module 350 also weights a time elapsed in a particular interaction session or a time remaining in a particular interaction session. Another implementation of module 350 also weights a location of an interaction. Another implementation of module 350 also weights a format (e.g. text, audio, video) of an interaction. One implementation of module 350 uses an attention layer, implemented using one or more encoding layers, to perform the weighting.

Module 350, optionally, filters vectors output from the attention layer. One implementation of module 350 filters vectors by treating weights within encoding layers of the trained attention layer as parameters of a Dirichlet distribution and removing vectors that are more than a threshold distance from one or more extreme points of the distribution. In one implementation of module 350, the x values of the Dirichlet distribution represent weights of the first encoding layer of the attention layer, and the alpha values represent weights of the second to last encoding layer of the attention layer.

Document adjustment module 360 adjusts a document in the weighted set of documents according to the weighted interaction type and the weighted scored sentiment. One implementation of module 360 uses a transformer model to adjust a document. Application 300 then provides the adjusted natural language document to a user.

Figure 4:
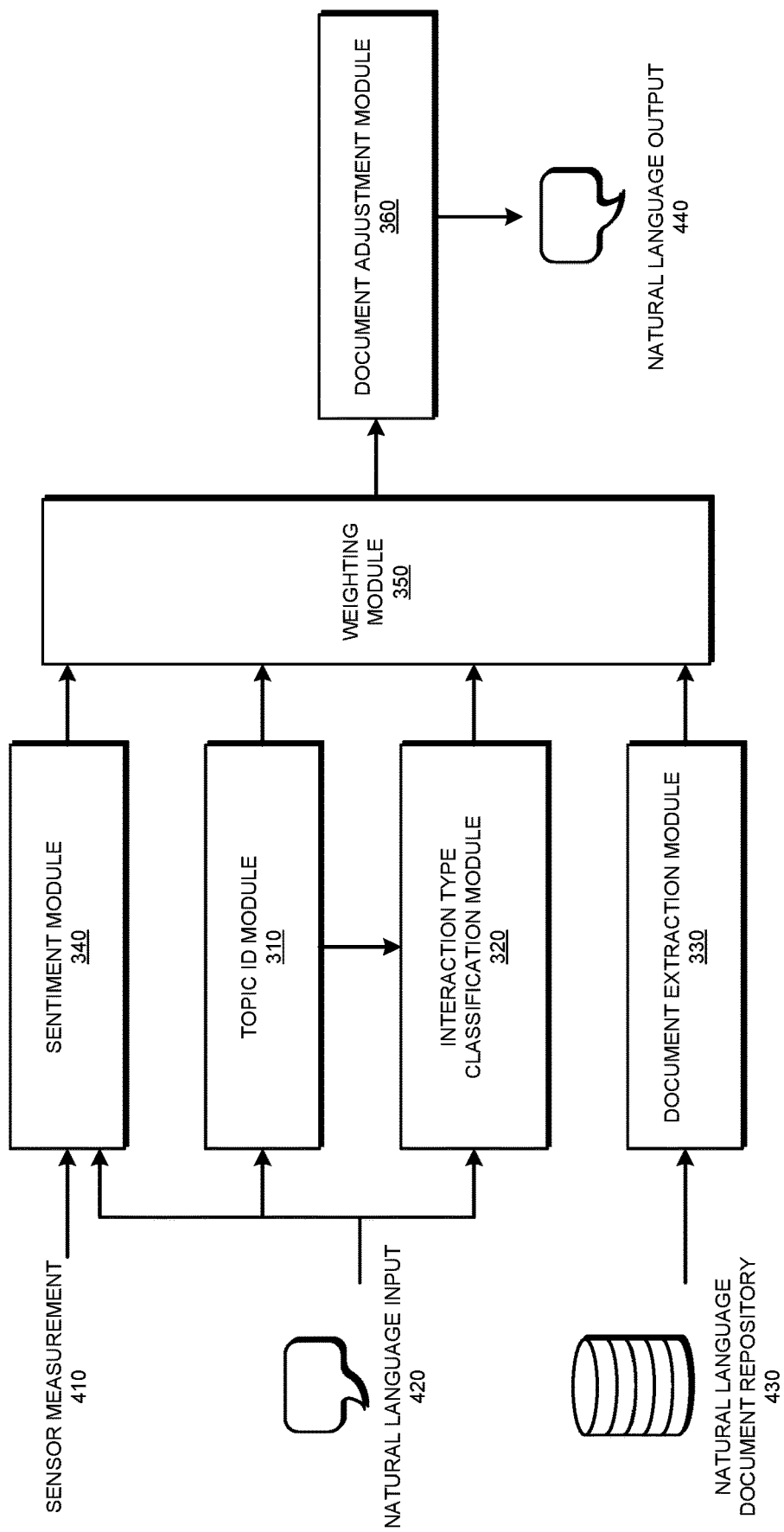
FIG. 4 depicts an example of automated document adaptation based on topic classification in accordance with an illustrative embodiment.

With reference to FIG. 4, this figure depicts an example of automated document adaptation based on topic classification in accordance with an illustrative embodiment. The example can be executed using application 300 in FIG. 3. Topic identification module 310, interaction type classification module 320, document extraction module 330, sentiment module 340, weighting module 350, and document adjustment module 360 are the same as topic identification module 310, interaction type classification module 320, document extraction module 330, sentiment module 340, weighting module 350, and document adjustment module 360 in FIG. 3.

As depicted, sentiment measurement module 340 uses sensor measurement 410 and natural language input 420 to scores a sentiment corresponding to a reaction to a previous presentation. Topic identification module 310 identifies an interaction topic from natural language input 420, and interaction type classification module uses the interaction topic and natural language input 420 to classify the interaction topic into an interaction type in a set of predefined interaction types. Document extraction module 330 extracts a set of documents corresponding to the topic from natural language document repository 430. Weighting module 350 weights the interaction type, the set of documents, and the scored sentiment. Document adjustment module 360 adjusts a document in the weighted set of documents according to the weighted interaction type and the weighted scored sentiment and provides the document to a user in the form of natural language output 440.

Figure 5:
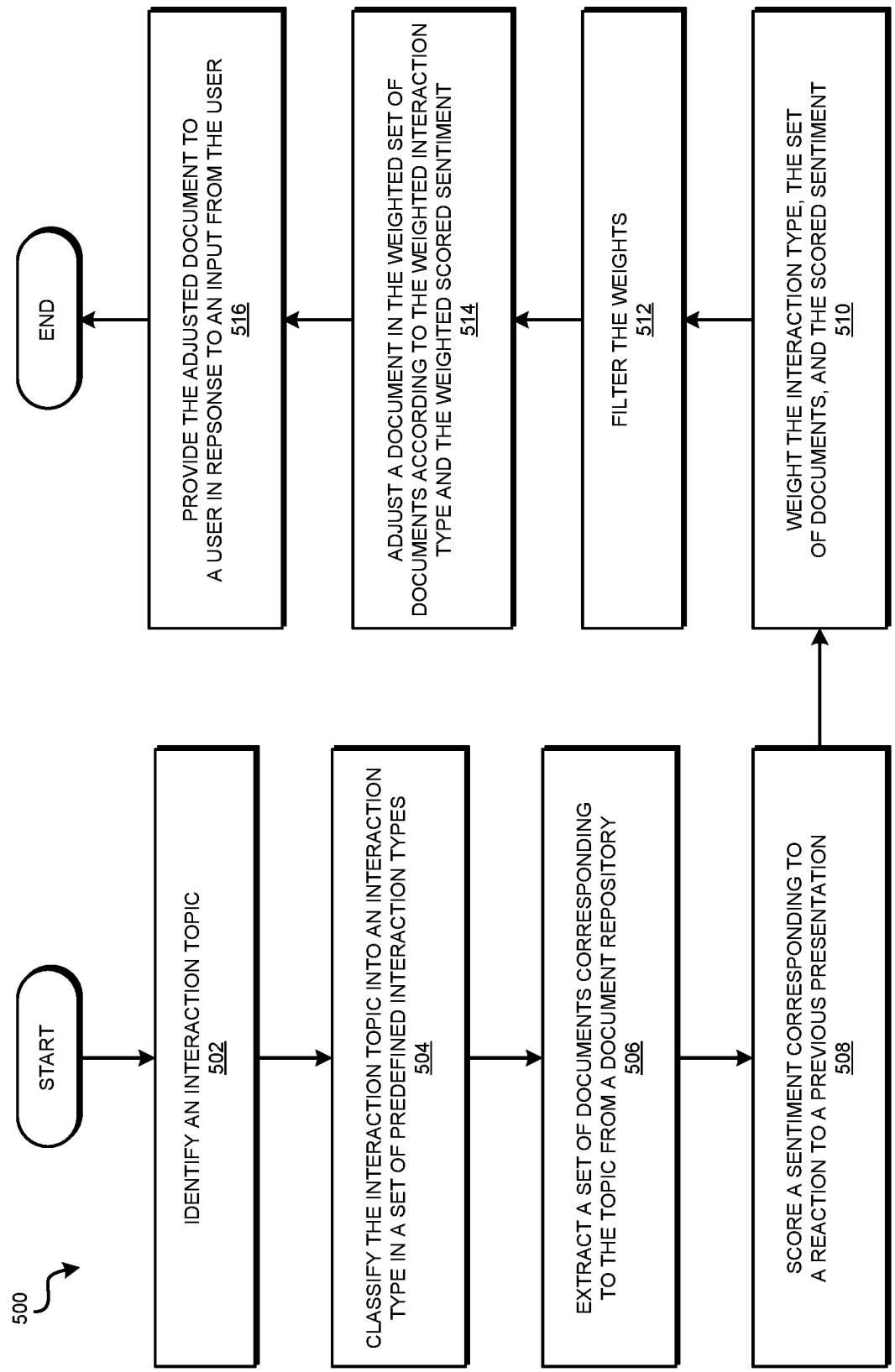
FIG. 5 depicts a flowchart of an example process for automated document adaptation based on topic classification in accordance with an illustrative embodiment.

With reference to FIG. 5, this figure depicts a flowchart of an example process for automated document adaptation based on topic classification in accordance with an illustrative embodiment. Process 800 can be implemented in application 300 in FIG. 3.

In block 502, the application identifies an interaction topic. In block 504, the application classifies the interaction topic into an interaction type in a set of predefined interaction types. In block 506, the application extracts a set of documents corresponding to the topic from a document repository In block 508, the application scores a sentiment corresponding to a reaction to a previous presentation. In block 510, the application weights the interaction type, the set of documents, and the scored sentiment. In block 512, the application filters the weights. In block 514, the application adjusts a document in the weighted set of documents according to the weighted interaction type and the weighted scored sentiment. In block 516, the application provides the adjusted document to a user in response to an input from the user. Then the application ends.

Figure 6:
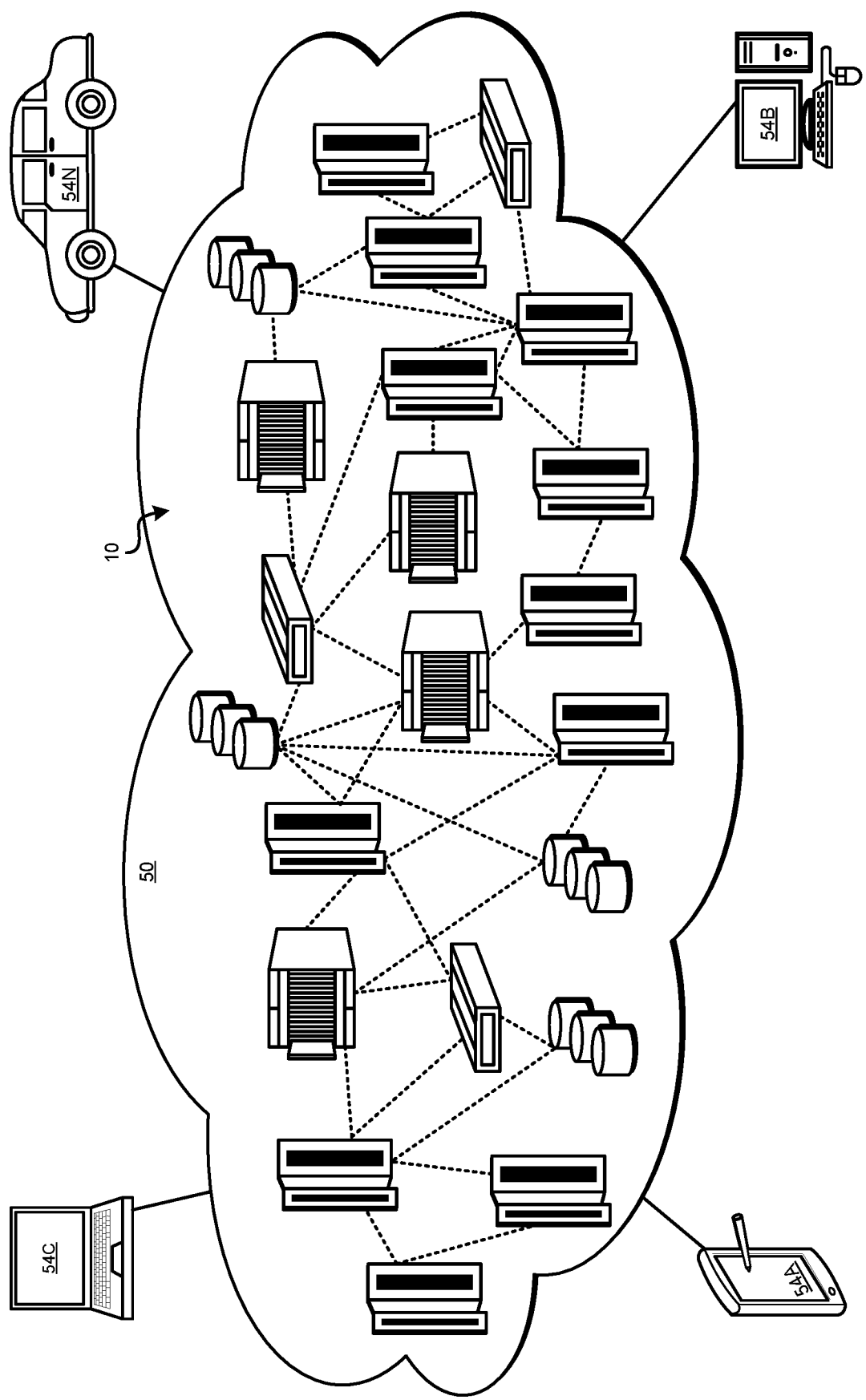
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 7:
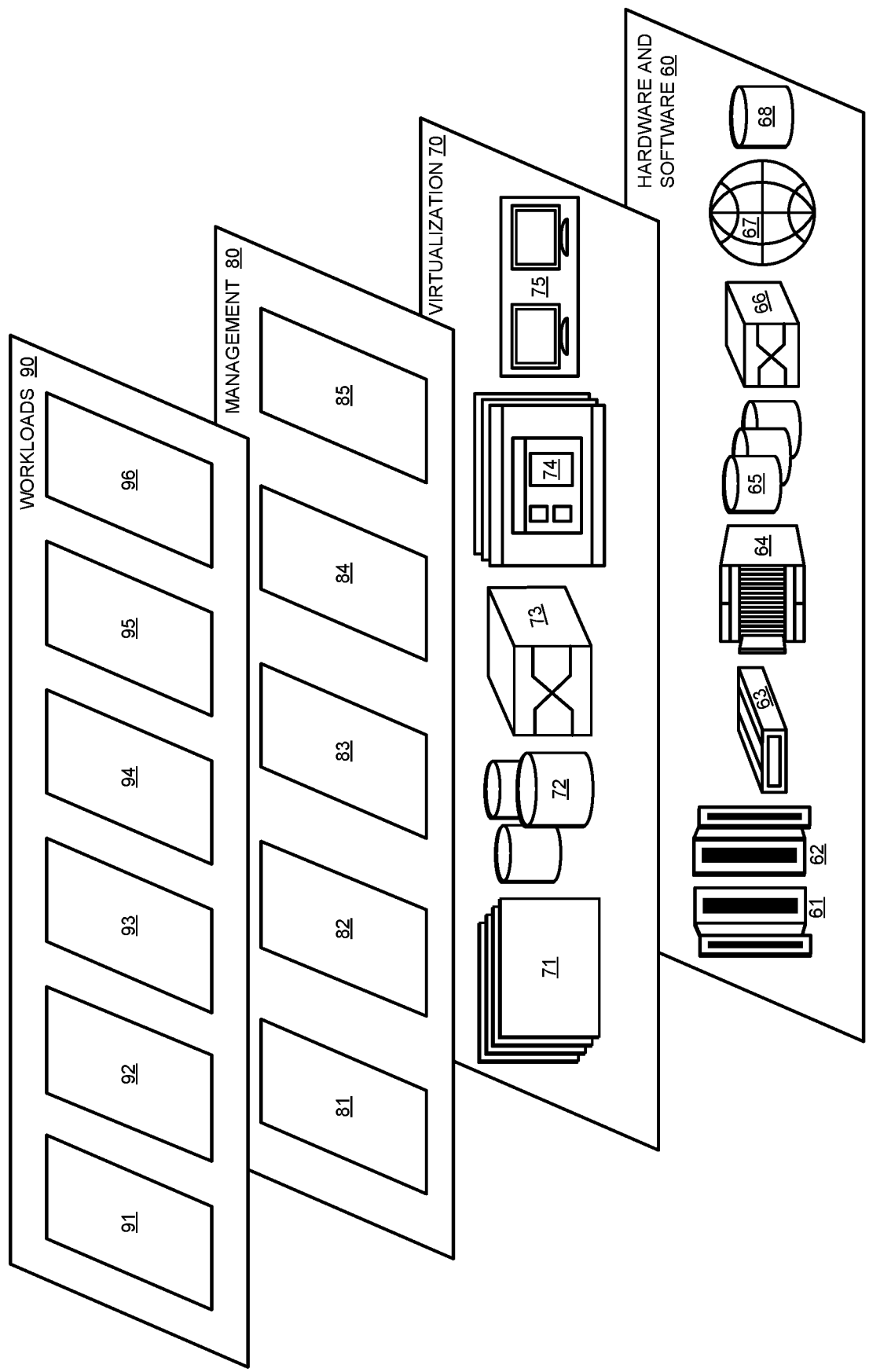
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for automated document adaptation based on topic classification and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
classifying, using a logistic regression classification model executing on a processor, a topic into an interaction type in a set of predefined interaction types;
extracting, from a document repository, a set of documents corresponding to the topic;
generating, using a generator sub-model of a generative adversarial model executing on a processor, from input data indicative of a reaction to a previous presentation, a scored sentiment corresponding to the reaction to the previous presentation;
weighting, using a trained attention layer model, the interaction type, the set of documents, and the scored sentiment, the weighting generating a weighted interaction type, a weighted set of documents, and a weighted scored sentiment; and
adjusting, using a natural language generation transformer model executing on the processor according to the weighted interaction type and the weighted scored sentiment, a portion of a document in the weighted set of documents, the adjusting comprising replacing, within the portion, a first sequence of words with a second sequence of words.

2. The computer-implemented method of claim 1, further comprising:
identifying, using a natural language processing model executing on the processor, the topic.

3. The computer-implemented method of claim 1, wherein the extracting further comprises:
expanding, using a word to vector model, the topic into a set of synonyms; and
identifying, using a concept to vector model, the set of documents.

4. The computer-implemented method of claim 1, wherein the reaction is measured using a sensor.

5. The computer-implemented method of claim 1, further comprising:
filtering, from a set of vectors output from the trained attention layer, a vector more than a threshold distance from an extreme point of a Dirichlet distribution.

6. The computer-implemented method of claim 1, further comprising:
outputting, as part of a user interaction, the adjusted document.

7. A computer program product for document adjustment, the computer program product comprising:
one or more computer readable storage media, and program instructions collectively stored on the one or more computer readable storage media, the stored program instructions comprising:
program instructions to classify, using a logistic regression classification model executing on a processor, a topic into an interaction type in a set of predefined interaction types;
program instructions to extract, from a document repository, a set of documents corresponding to the topic;
program instructions to generate, using a generator sub-model of a generative adversarial model executing on a processor, from input data indicative of a reaction to a previous presentation, a scored sentiment corresponding to the reaction to the previous presentation;
program instructions to weight, using a trained attention layer model, the interaction type, the set of documents, and the scored sentiment, the weighting generating a weighted interaction type, a weighted set of documents, and a weighted scored sentiment; and
program instructions to adjust, using a natural language generation transformer model executing on the processor according to the weighted interaction type and the weighted scored sentiment, a portion of a document in the weighted set of documents, the adjusting comprising replacing, within the portion, a first sequence of words with a second sequence of words.

8. The computer program product of claim 7, the stored program instructions further comprising:
program instructions to identify, using a natural language processing model executing on the processor, the topic.

9. The computer program product of claim 7, wherein the extracting further comprises:
program instructions to expand, using a word to vector model, the topic into a set of synonyms; and
program instructions to identify, using a concept to vector model, the set of documents.

10. The computer program product of claim 7, wherein the reaction is measured using a sensor.

11. The computer program product of claim 7, the stored program instructions further comprising:
program instructions to filter, from a set of vectors output from the trained attention layer, a vector more than a threshold distance from an extreme point of a Dirichlet distribution.

12. The computer program product of claim 7, the stored program instructions further comprising:
    program instructions to output, as part of a user interaction, the adjusted document.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
    program instructions to classify, using a logistic regression classification model executing on a processor, a topic into an interaction type in a set of predefined interaction types;
    program instructions to extract, from a document repository, a set of documents corresponding to the topic;
    program instructions to generate, using a generator sub-model of a generative adversarial model executing on a processor, from input data indicative of a reaction to a previous presentation, a scored sentiment corresponding to the reaction to the previous presentation;
    program instructions to weight, using a trained attention layer model, the interaction type, the set of documents, and the scored sentiment, the weighting generating a weighted interaction type, a weighted set of documents, and a weighted scored sentiment; and
    program instructions to adjust, using a natural language generation transformer model executing on the processor according to the weighted interaction type and the weighted scored sentiment, a portion of a document in the weighted set of documents, the adjusting comprising replacing, within the portion, a first sequence of words with a second sequence of words.

17. The computer system of claim 16, the stored program instructions further comprising:
    program instructions to identify, using a natural language processing model executing on the processor, the topic.

18. The computer system of claim 16, wherein the extracting further comprises:
    program instructions to expand, using a word to vector model, the topic into a set of synonyms; and
    program instructions to identify, using a concept to vector model, the set of documents.

19. The computer system of claim 16, wherein the reaction is measured using a sensor.

20. The computer system of claim 16, the stored program instructions further comprising:
    program instructions to filter, from a set of vectors output from the trained attention layer, a vector more than a threshold distance from an extreme point of a Dirichlet distribution.

* * * * *